# 3,201,267
METHOD OF PRODUCING FUSION CAST, BASIC REFRACTORY BODIES

John I. Slaughter, Inglewood, Calif., assignor to Corhart Refractories Company, Inc., Louisville, Ky., a corporation of Delaware
No Drawing. Filed May 15, 1962, Ser. No. 194,984
3 Claims. (Cl. 106—59)

This application is a continuation-in-part of my application S.N. 813,352, filed May 15, 1959, and abandoned May 26, 1962.

This invention relates to basic refractory bodies cast from a fused mixture of magnesia and chrome ore. Refractories of this type are described in United States Patents No. 2,599,566 and No. 2,690,974 to R. J. Magri, Jr. The present invention relates more particularly to an improved method for their production.

In accordance with prior production practice, a mixture of chrome ore and calcined magnesite is employed in the interest of economy. This mixture, or batch, is melted in an electric arc furnace to attain the required high melting temperatures. The fused material is poured into molds to cool and crystallize into solid refractory blocks.

In accordance with the Magri teaching, blocks composed essentially of MgO, $Cr_2O_3$, $Al_2O_3$ and FeO in defined proportions contain both periclase and spinel phases and are particularly effective as a refractory material in metal producing furnaces such as open hearth furnaces. Both $SiO_2$ and CaO may be tolerated in limited amounts to permit the use of low cost raw materials. It is generally accepted, however, that these latter oxides produce low melting compounds and diminish the refractoriness of the end product.

Because of the extremely high melting temperatures involved, and the brittleness of the oxide mixtures, the molding and heat treating techniques developed in other areas of molten material processing, such as metal or glass, have not been considered feasible for production of fusion cast refractory material. Rather, it has been found convenient to cast the molten material into relatively large graphite molds buried in insulating material. These are set aside to cool by natural loss of heat through the mold walls and insulation. The large cast blocks are then sawed into bricks of suitable size for furnace construction.

In adapting the practice to commercial refractory production, it was frequently found that entire production lots either cracked during sawing, or disintegrated during storage and shipment of the material. This situation became quite intolerable and threatened the commercial future of this type of refractory.

It is a primary purpose of this invention to correct this problem and provide a method of improving the intrinsic strength of basic fused refractories. A further purpose is to provide a method of consistently producing strong, fusion cast, basic refractory bodies. Another purpose is to provide an improved method of producing such refractories by a self-cooling process. A specific purpose is to provide an improved method of producing refractories containing periclase and spinel crystal phases.

I have discovered that this problem of intrinsic strength can be corrected by proper control of the CaO content in the refractory batch and my invention is based on this discovery. The invention resides in a method of producing fusion cast, basic refractory articles by casting a fused mixture of magnesia and chrome ore into a mold and cooling by heat transfer through the mold wherein the internal strength of the cast article is improved by incorporating into the melt an amount of CaO equivalent to at least 0.5% of the refractory article by weight.

It has long been recognized that CaO, or lime, is commonly present in magnesia raw materials such as calcined magnesite and may be present in relatively large amounts in materials the dolomite type. In recognition of this fact, the Magri patents taught that CaO might be tolerated in amounts up to about 10%, although preferably not exceeding about 3%, for economy purposes. It was not, however, previously recognized that CaO could perform any useful function in this type of refractory or that its presence was required. It effect, it was regarded as a tolerable impurity, and, as low lime raw materials were available, they were employed with the result that lime contents varied erratically. However, there was no apparent reason to suspect this as a source of difficulty, and it was initially though that external influences, such as high humidity, were causing disintegration of the material.

Studies have revealed, however, that low strength refractory materials are associated with a low lime content in the batch materials and that proper control of this ingredient provides consistently higher strength materials when the self-annealing production process is employed.

The exact mechanism whereby lime improves the intrinsic strength of a refractory is not as yet known. In accordance with one theory, lime reacts with another material such as silica to produce a low melting matrix whereby stresses are avoided or released in the refractory block during cooling and crystallization. This theory assumes that severe expansion gradients between the crystal phases may develop during the initial stages of crystallization which occur at high temperatures.

It may also be argued that the function of the lime is to react with oxides which would otherwise produce deleterious compounds in the refractory material. It is also possible that the lime inhibits hydration and stabilizes the material as it crystallizes. While I am not in a position to explain the mechanism, I have found from considerable experimental and commercial production data that consistently higher strengths are obtained when steps are taken to insure a content of at least 0.5% CaO in the refractory batch.

When it is necessary or desirable to employ raw materials which have a relatively low content of lime, the benefits of the invention may be achieved by adding sufficient lime to the batch to bring the total content up to or above the required 0.5%. While any compatible calcium compound may be employed, it is convenient to add the lime as calcium carbonate.

In general, further improvement in intrinsic strength occurs as more CaO is added to bring the total content up to about 1%. Further additions, that is additions bringing the content above about 1%, generally provide essentially the same improved intrinsic strength as achieved with 1% CaO. In other words, intrinsic strength reaches a plateau or relatively constant value at about 1% CaO and further additions do not create any substantial change in this value.

However, large total lime contents have secondary effects in that they decrease the slag resistance and hence the refractory value of the material. Also, they may result in formation of incompatible compounds such as calcium chromite which in turn results in cracking of a body. As a practical matter because of these secondary effects, CaO should not be added in such amount as to provide over about 6% and preferably not over 3% in the material.

In the course of these studies, a simple load testing procedure has been devised for distinguishing between acceptable and unacceptable refractory brick. Expressed in terms of modulus of rupture, as measured by applying pressure against a supported brick, bricks having a modulus value of about 600 p.s.i. or greater are found to be relatively stable in storage and use. On the other hand, bricks having lower modulus values tend to disintegrate or break up during handling and to crumble badly when stored under moist conditions.

Based on this empirical qualifying test, I have found that self-annealed blocks having an acceptable internal strength or modulus of rupture require a minimum lime content of about 0.5%. By way of comparison bricks produced during a period of low lime batch materials, total lime content about 0.2%, showed moduli of rupture varying from 0–500 p.s.i. A major proportion of such bricks cracked up or crumbled before they could be installed in a furnace structure and hence were rejected as unusable.

When similar batch materials were employed with a sufficient addition of lime to the batch to provide about 0.7% CaO, the resulting bricks showed moduli of 600–1200 p.s.i. and remained stable in handling and storage. Furthermore, open hearth roofs constructed with such brick having a minimum modulus of 600 p.s.i. provided a furnace life of over 300 heats in a large commercial open hearth unit.

What is claimed is:

1. A method of producing a fusion cast, basic refractory article from a magnesia-chrome ore batch that has a lime content insufficient to provide at least 0.5% CaO in the cast article which comprises adding to such batch a sufficient amount of a compatible calcium compound to provide at least 0.5%, but not over about 6%, CaO in the cast article, fusing the calcium enriched batch, casting the melt into molds and solidifying the cast material by natural heat transfer through the mold walls.

2. A method in accordance with claim 1 wherein the calcium compound is added in such amount as to provide 0.5–3.0% CaO in the cast article.

3. A method in accordance with claim 1 wherein the calcium compound is added in such amount as to provide 0.5–1.0% CaO in the cast article.

References Cited by the Examiner
UNITED STATES PATENTS

| | | | |
|---|---|---|---|
| 2,599,566 | 6/52 | Magri | 106—59 |
| 2,690,974 | 10/54 | Magri | 106—59 |

TOBIAS E. LEVOW, *Primary Examiner*.